United States Patent
Allen et al.

(10) Patent No.: US 7,835,309 B2
(45) Date of Patent: Nov. 16, 2010

(54) MULTIPLEXED COMMUNICATION FOR DUPLEX APPLICATIONS

(75) Inventors: Nicholas A. Allen, Redmond, WA (US); Stefan R. Batres, Sammamish, WA (US); Philbert L. Henning, II, Sultan, WA (US); Margaret J. Lye, Redmond, WA (US); Evgeny Osovetsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 12/336,233

(22) Filed: Dec. 16, 2008

(65) Prior Publication Data

US 2010/0150031 A1 Jun. 17, 2010

(51) Int. Cl.
*H04B 1/56* (2006.01)
*H00L 5/14* (2006.01)

(52) U.S. Cl. .................. 370/276; 709/227; 709/228
(58) Field of Classification Search ............. 370/276; 709/227, 228, 203
See application file for complete search history.

(56) References Cited

U.S. PATENT DOCUMENTS

| | | | |
|---|---|---|---|
| 5,987,611 A * | 11/1999 | Freund ..................... | 726/4 |
| 6,035,324 A | 3/2000 | Chang et al. | |
| 6,795,851 B1 | 9/2004 | Noy | |
| 7,117,267 B2 | 10/2006 | Bavadekar | |
| 2002/0156927 A1 | 10/2002 | Boucher | |
| 2003/0069994 A1* | 4/2003 | Herceg et al. ............ | 709/246 |
| 2004/0086100 A1* | 5/2004 | Moore et al. ............ | 379/201.01 |
| 2005/0114442 A1 | 5/2005 | Hardwick et al. | |
| 2006/0174016 A1 | 8/2006 | Critchley et al. | |
| 2007/0112962 A1 | 5/2007 | Lewontin | |
| 2008/0183842 A1 | 7/2008 | Raji et al. | |
| 2008/0205304 A1* | 8/2008 | Shivas et al. ............ | 370/276 |

OTHER PUBLICATIONS

McGrattan, Peter, "Silverlight 2 WCF Polling Duplex Support—Part 1: Architecture", Sep. 2008, 6 pages.
Wahlin, Dan, "Pushing Data to a Silverlight Client with a WCF Duplex Service—Part II", 2008, 11 pages.
Esenther, Alan W., "Instant Co-Browsing" Lightweight Real-time Collaborative Web Browsing, 2002, 4 pages.
Berg, Pal, "Asynchronous and full duplex communication over HTTP", May 28, 2008, 3 pages.
Regnier, Greg, "CSP: A System-Level Architecture for Scalable Communication Services", Intel Technology Journal Q2, May 2001, 6 pages.
Yong, Hee, et al., "The Approaches for High Available and Fault-Tolerant Cluster Systems", FTCC 2000, May 2000, 11 pages.

* cited by examiner

*Primary Examiner*—Ricky Ngo
*Assistant Examiner*—David Oveissi
(74) *Attorney, Agent, or Firm*—Workman Nydegger (57) ABSTRACT

The present invention extends to methods, systems, and computer program products for multiplexed communication for duplex applications. Embodiments of the invention facilitate a multiplexed variant of long polling over a request/reply communication medium that (potentially significantly) reduces the resources utilized when exchanging messages. The lightweight address generation mechanism facilitates polling and routing for a pool of many clients and many services while minimizing allocated resources to each established session. Further, the benefits of a lower latency bidirectional communication medium between clients and services can be utilized.

25 Claims, 4 Drawing Sheets

MULTIPLEXED COMMUNICATION FOR DUPLEX APPLICATIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

On many networks, such as, for example, the Internet, HyperText Transfer Protocol ("HTTP") is the prevalent communication medium used to exchange electronic data. A significant number of network connected personal computers have general purposed libraries and client programs, such as, for example, Web browsers, for executing HTTP applications. Thus, network and systems administrators typically permit HTTP traffic, often with little or no filtering restrictions, to a far greater degree than most other protocols. This combination of near universal compatibility and increased access gives HTTP a tremendous reach for establishing connections and exchanging information between two systems.

However, HTTP is bound to a particular request-reply message exchange pattern that limits initiation of message exchanges to one side and permits only one reply for any given message. Frequently, there are limitations applied to the number of simultaneous HTTP connections and the length of use of an HTTP connection outside of the control of the application developer. There are many common application patterns that require exchanging messages in an unrestricted bidirectional fashion, sometimes with long gaps between message exchanges and with unbalanced numbers of exchanges between the client and server.

BRIEF SUMMARY

The present invention extends to methods, systems, and computer program products for multiplexed communication for duplex applications. One or more client computer systems communicate with one or more duplex client components over one or more duplex communication mediums. The one or more duplex client components communicate with a duplex service component over one or more request/reply communication mediums. The duplex service component communicates with one or more services over one or more duplex communication mediums.

In some embodiments, a duplex client component receives an application message from a client using one of the one or more duplex communication mediums. The duplex client component formulates the application message into a request of a request/reply protocol. The request includes an endpoint identifier and a session identifier. The endpoint identifier identifies the client endpoint used between the duplex client component and the duplex service component. The session identifier identifies a particular connection between the client and a service from among all the connections between the duplex client component and the duplex service component. The duplex client component sends the request to the duplex service component using a request/reply communication medium.

The duplex service component receives the request, including the endpoint identifier and the session identifier, from the duplex client component using the request/reply communication medium. The duplex service component queues the request in a read queue. The read queue is configured to queue requests that are waiting for replies. The duplex service component receives an application message from a service using one of the one or more duplex communication mediums to the service. The application message includes an endpoint identifier and the session identifier.

The duplex service component service component queues the application message in a write queue. The write queue is configured to queue application messages to return for subsequent client requests. The duplex service component sends a reply to the duplex client component using the request/reply communication medium. The reply is sent to the duplex client component based on the endpoint identifier. The reply corresponds to the request that was received using the request/reply protocol.

The duplex client component receives the reply from the duplex service component using the request/reply communication medium. The duplex client component formulates the reply into a message to send over the duplex communication medium to the client. The duplex client component sends the message to the client using the duplex communication medium based on the session identifier.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for multiplexed communication for duplex applications. One or more client computer systems communicate with one or more duplex client components over one or more duplex communication mediums. The one or more duplex client components communicate with a duplex service component over one or more request/reply communication mediums. The duplex service component communicates with one or more services over one or more duplex communication mediums.

In some embodiments, a duplex client component receives an application message from a client using one of the one or more duplex communication mediums. The duplex client component formulates the application message into a request of a request/reply protocol. The request includes an endpoint identifier and a session identifier. The endpoint identifier identifies the client endpoint used between the duplex client component and the duplex service component. The session identifier identifies a particular connection between the client and a service from among all the connections between the duplex client component and the duplex service component. The duplex client component sends the request to the duplex service component using a request/reply communication medium.

The duplex service component receives the request, including the endpoint identifier and the session identifier, from the duplex client component using the request/reply communication medium. The duplex service component queues the request in a read queue. The read queue is configured to queue requests that are waiting for replies. The duplex service component receives an application message from a service using one of the one or more duplex communication mediums to the service. The application message includes an endpoint identifier and the session identifier.

The duplex service component service component queues the application message in a write queue. The write queue is configured to queue application messages to return for subsequent client requests. The duplex service component sends a reply to the duplex client component using the request/reply communication medium. The reply is sent to the duplex client component based on the endpoint identifier. The reply corresponds to the request that was received using the request/reply protocol.

The duplex client component receives the reply from the duplex service component using the request/reply communication medium. The duplex client component formulates the reply into a message to send over the duplex communication medium to the client. The duplex client component sends the message to the client using the duplex communication medium based on the session identifier.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims, a "duplex communication medium" is defined as a communication medium between two connected parties that permits communication in both directions between the parties and wherein either party can independently initiate communication to the other party across the communication medium. Duplex communication medium is defined to include both half duplex communication mediums (one party sends and another party receives at a time) and full duplex communication mediums (both parties are permitted to simultaneously send and receive).

Figure 1:
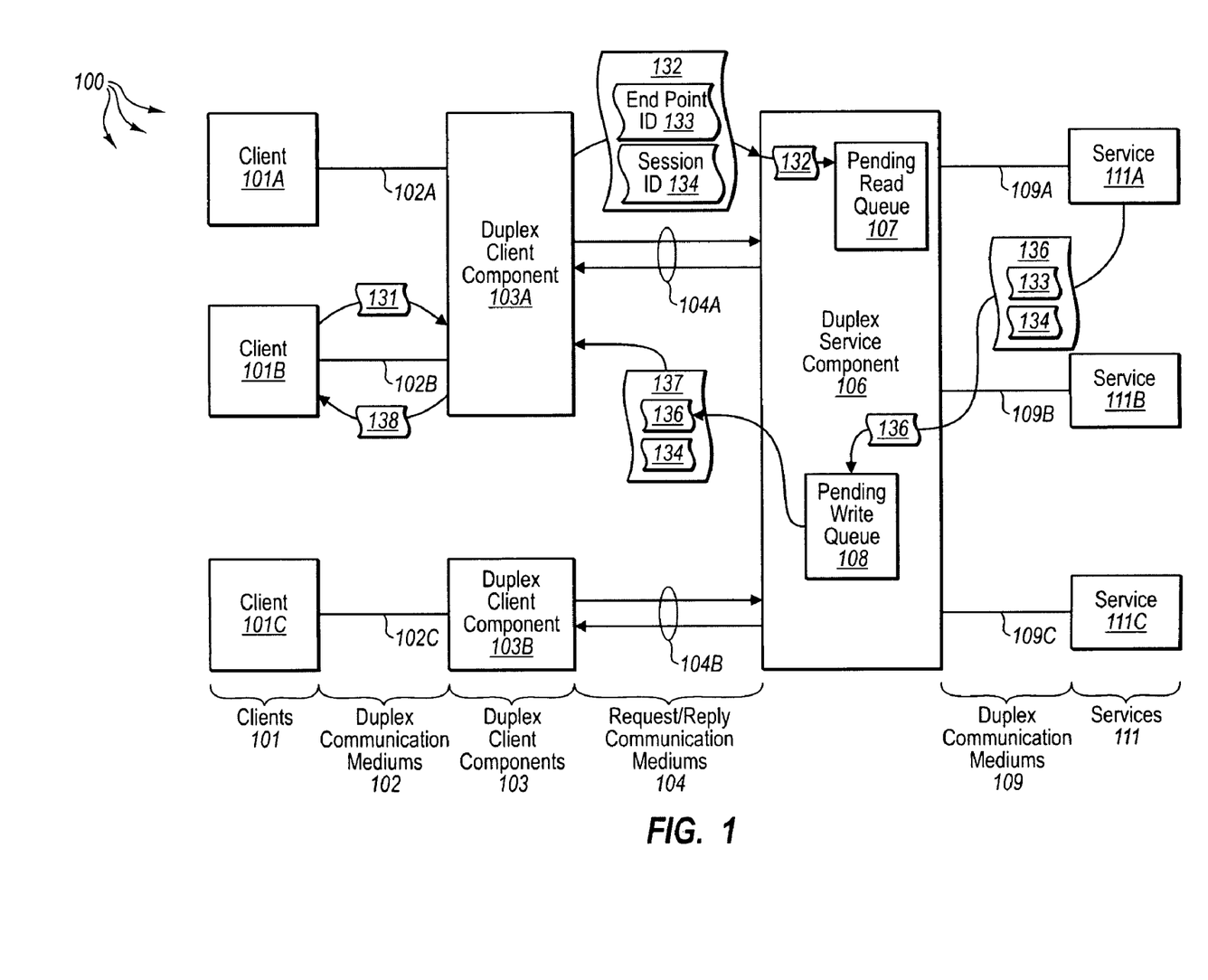
FIG. 1 illustrates an example computer architecture that facilitates multiplexed communication for duplex applications.

In this description and in the following claims, a "request/reply communication medium" is defined as a communication medium between two connected parties that permits (potentially exactly) paired communication between the parties. A requester (e.g., client) sends a request message to a replier system (e.g., server) which receives and processes the request, ultimately returning a message in response. Request/reply can be implemented in a synchronous or asynchronous manner. HyperText Transfer Protocol ("HTTP") is an example of a request/reply communication medium FIG. 1 illustrates an example computer architecture 100 that facilitates multiplexed communication for duplex clients. Referring to FIG. 1, computer architecture 100 includes clients 101, duplex client components 103, duplex service component 106, and services 111. Each of components depicted in computer architecture 100 is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), HTTP, Simple Mail Transfer Protocol ("SMTP"), etc.) over the network.

Different components within computer architecture 100 can be connected to one another via different types of communication mediums, including duplex communication mediums and request/reply communication mediums. For example, duplex communication mediums 102 connect clients 101 to duplex client components 103. Duplex communication mediums 102 can include network communication mediums as well as system bus communication mediums. Request/reply communication mediums (e.g., HTTP) connect duplex client components 103 to duplex service component 106. Duplex communication mediums 109 connect duplex service component 106 to services 111.

Different communication mediums can be located on portions of different networks. For example, duplex communications mediums 102 can be located on a corporate LAN or WAN under the control of a one or more different corporations. Request/reply communication mediums 104 can be located on a public WAN, such as, for example, the Internet. Duplex communications mediums 109 can be located on a service provider LAN or WAN under the control of one or more different service providers. Accordingly, clients 101 can be computer systems that from time to time send requests to services 111.

Clients 101 include clients 101A, 101B, and 101C, each of which can be under the control of the same or different entities. Clients in clients 101 can be client applications, such as, for example, Web browsers or Web service components. Duplex communication mediums 102 include duplex communication mediums 102A, 102B, and 102C, each of which can connect a client to a corresponding duplex client component and each of which can be under the control of the same or different entities. Thus, clients 101 can send messages to and receive messages from duplex client components 103 over duplex communication mediums 102.

Duplex client components 103 include duplex client components 103A and 103B. Each of duplex client components 103A and 103B are configured to receive messages from and send messages to clients 101 over duplex communication mediums 102. Each of duplex client components 103A and 103B are also configured to send requests to duplex service component 106 over request/reply communication mediums 104 and to receive corresponding replies from duplex service component 106 over request/reply communication mediums 104. Request/reply communication mediums 104 include request/reply communication mediums 104A and 104B, each of which can connect a client duplex component to duplex service component 106. As such, duplex client components 103 are also generally configured to appropriately convert between duplex communication and request/reply communication.

Similar to clients, duplex client components can be under the control of the same or different entities. In some embodiments, one or more clients and a duplex client component are under the control of the same entity. For example, clients 101A, 101B, and duplex client component 103A can be under the control of the same first entity. For example, duplex client component 103B could be hosted in a web browser process and clients 101A, 101B could be controls hosted in a web page displayed by the web browser. Similarly, client 101C and duplex client component 103B can be under the control of the same second entity (that is different than the first entity). Alternately, a duplex client component can be under the control of one entity that is configured to process messages for the clients of one or more different other entities. For example, clients 101A, 101B, and duplex client component 103A can each be under the control of a different entity.

Services 111 include services 111A, 111B, and 111C, each of which can be under the control of the same or different entities. Services in services 111 can be service applications, such as, for example, Web servers or Web service components. Duplex communication mediums 109 include duplex communication mediums 109A, 109B, and 109C, each of which can connect a service to duplex service component 106 and each of which can be under the control of the same or different entities. Thus, services 111 can send messages to and receive messages from duplex service component 106 over duplex communication mediums 109.

Duplex service component 106 is configured to receive requests from duplex client components 103 over request/reply communication mediums 104 and to send corresponding replies to duplex client components 103 over request/reply communication mediums 104. Duplex service component 106 is also configured to receive messages from and send messages to services 111 over duplex communication mediums 109. As such, duplex service component 106 is also generally configured to appropriately convert between duplex communication and request/reply communication.

Duplex service component 106 includes pending read queue 107 and pending write queue 108. Pending read queue 107 is configured to hold requests received from duplex client components until messages responsive to the requests are received from services. Likewise, pending write queue 108 is configured to hold messages received from services until requests for the messages are received from duplex client components.

Duplex service component 106 can position received requests in pending read queue 107 based on any of a variety of differing criteria, such as, for example, user authorization, service level agreements ("SLA"), and system resources. For example, requests from a specified user and/or service level can be positioned closer to the front of pending read queue 107.

In some embodiments, duplex client 106 considers a random factor when positioning a request in pending read queue 107. For example, when pending read queue 107 is at or near capacity duplex client 106 can begin using the random factor. Pending read queue 107 can be configured with resources capable of handling a specified load of duplex client components and corresponding clients. Thus, when pending read queue 107 is at or near capacity, there is some likelihood that duplex service component is experiencing a denial of service attack. Using a random factor to position requests results in a likelihood of at least some legitimate requests replacing illegitimate requests within pending read queue 107. Accordingly, using a random factor when determining positioning within a pending read queue can mitigate the impact of a denial of service attack.

Generally, when a client is to communicate with a service, the client requests that its corresponding duplex client component create a bidirectional connection to the service with a particular service address. A client can make such a request to a local duplex client via method call. Alternately, the client can make the request over a network based duplex communication medium. When a bidirectional connection already exists, the duplex client component can provide that bidirectional connection to the client. When a bidirectional connection does not exist, the duplex client component creates a new bidirectional connection.

To create a bidirectional connection, the duplex client component may transmit a CreateSession protocol message across the request-reply communication medium to the appropriate duplex service component for the particular service address. The CreateSession protocol message comprises an anonymous endpoint identifier and a session identifier. The anonymous endpoint identifier is a globally unique identifier that identifies the client endpoint used between the duplex client component and duplex service component. The session identifier is a unique identifier with respect to the anonymous endpoint identifier. In some embodiments, the session identifier may be globally unique as well. The session identifier identifies the particular connection between the client and service from among all of the connections going between this duplex client component and duplex service component pair. This pair of identifiers may be considered equivalent to the definition of the connection.

In some embodiments, the anonymous endpoint identifier and session identifier may be formatted in XML as in the following message fragment:

```
<netdx:Duplex>
  <netdx:Address>
    http://docs.oasis-open.org/ws-rx/wsmc/200702/anonymous?id=
123fbcd4-e6a4-56be-7a32-66d84187a42c
  </netdx:Address>
  <netdx:SessionId>
```

-continued

```
    914ed9db-e6c6-47be-9f62-15aaa3c916ba
  </netdx:SessionId>
</netdx:Duplex>
```

The CreateSession protocol message may be a stand alone protocol message or may be piggybacked on the first application message. For example, the above XML fragment may appear in the headers of a SOAP envelope that includes the application message in the envelope body.

Upon receiving a CreateSession protocol message, the duplex service component may decide whether to accept the connection request. The duplex service component may make this decision based on user authorization, a service level agreement with the user of the client application, available service resources, or the like. The duplex service component may then transmit a CreateSessionRejected protocol message or a CreateSessionAccepted protocol message to the duplex client component.

These protocol messages may be standalone protocol messages. For example, the CreateSessionAccepted protocol message may be an HTTP protocol message with status 202 Accepted and the CreateSessionRejected protocol message may be an HTTP protocol message with status 4xx (client error) or 5xx (server error). Alternatively, the protocol messages may piggyback some application message. In some embodiments the duplex service component may simply drop the connection request rather than send the CreateSessionRejected protocol message as sending messages may make the underlying problem, such as a lack of resources, worse.

The duplex service component may not immediately decide to accept or reject the CreateSession protocol message. For example, there may not currently be available resources on the service but the duplex service component may believe that these resources are likely to soon become available. The duplex service component may place the CreateSession protocol message in a queue or otherwise refrain from replying for some time until a decision can be made. If the queue is full, the duplex service component may drop the new CreateSession protocol message or may replace one of the earlier CreateSession protocol messages to balance fairness between newer and older requests. The duplex client component may decide at some point to give up waiting for a response. The duplex client component may completely give up on the connection attempt and return an error to the client or may retry one or more times to create a connection.

Determining whether or not to accept a create session request can be based on one or more of user authorization, service level agreement ("SLA"), available resources, etc. For example, depending on available resources, a session creation request for a premium account may be accepted while other session creation requests are denied.

Figure 3:
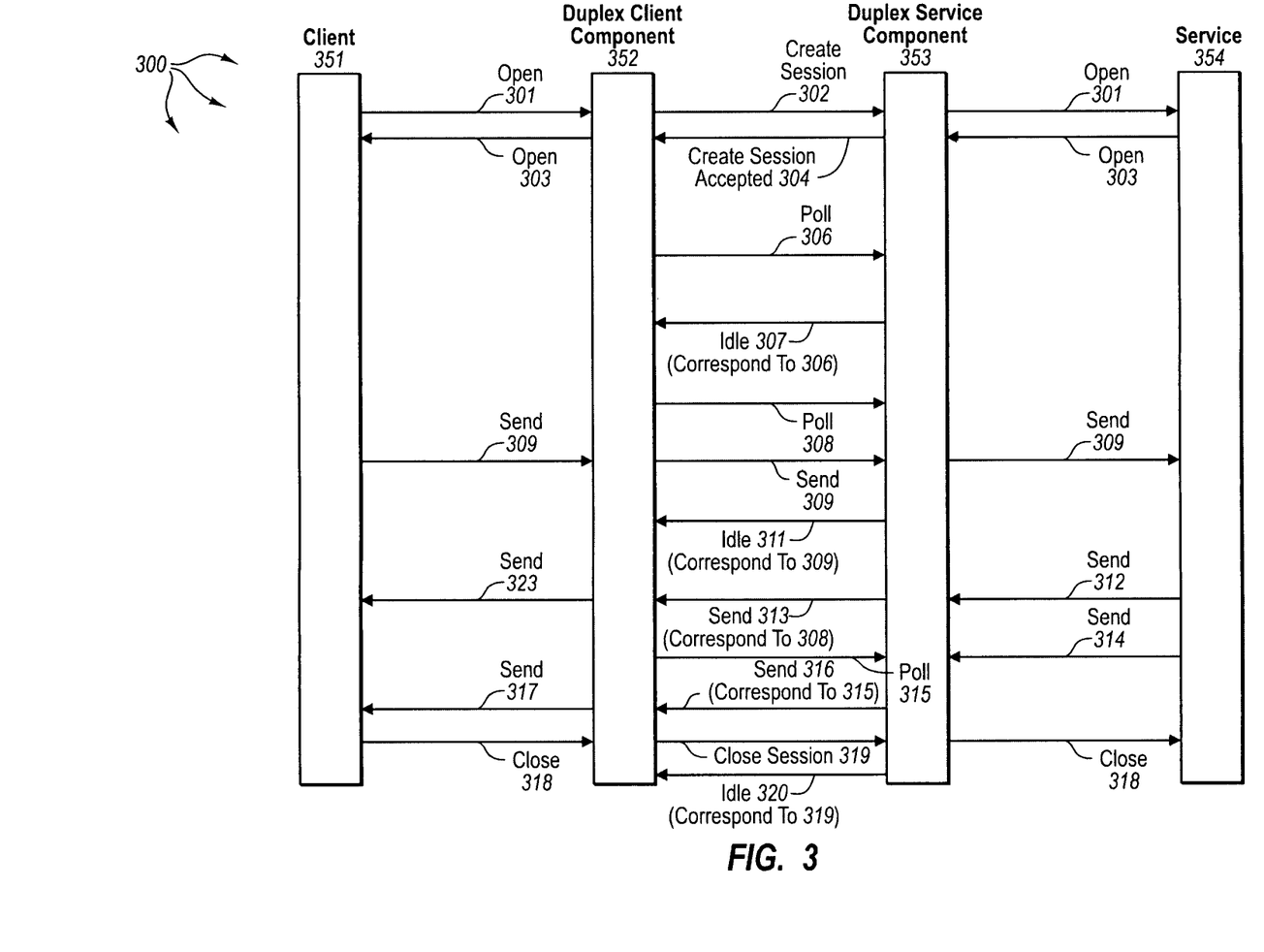
FIG. 3 illustrates an example series of message exchanges between a client and service mediated by a duplex client component and a duplex service component.

FIG. 3 illustrates an example series 300 of message exchanges between a client and service mediated by a duplex client component and a duplex service component. Referring briefly now to FIG. 3, client 351 sends open message 301 to duplex client component 352. In response, duplex client 352 sends create session message 302, such as, for example, a CreateSession Protocol Message including an anonymous endpoint identifier and a session identifier, to duplex service component 353. In response, duplex client component 353 forwards open message 301 to service 354.

In response, service 354 sends open message 303 back to duplex service component 353. In response, duplex service component 353 sends create session accepted message 304, as a reply to create session message 302 and indicating acceptance of the session to duplex client component 352. In response, duplex client component 352 forwards open message 303 to client 351. Accordingly, both duplex client component 352 and duplex service component 353 have knowledge of the endpoint identifier and session identifier corresponding to the connection for client 351.

Referring back to FIG. 1, after a connection is created, the service or client can send a message at any time. For example, service 111A can choose to send messages to client 101B. Service 111A sends the messages to duplex service component 106. Duplex service component 106 can place the service application messages in pending write queue 108 to temporarily buffer the messages until a suitable opportunity is available for transmission.

A client may choose to send messages to a service. For example, client 101B can choose to send messages to service 111A. Client 101B sends the messages to duplex client component 103A, which uses request-reply communication mediums 104A to transmit the client application messages as request messages. The duplex client component may enrich the outgoing client application message with protocol data comprising the anonymous endpoint identifier and session identifier.

The enriched application message may use the same application protocol as the unenriched application message. For example, the enrichment may comprise the same XML fragment as described for the CreateSession protocol message and be incorporated in the headers of a SOAP envelope that includes the application message in the envelope body. Alternatively, the enriched application message may be represented in some different protocol than the unenriched application message. For example, the application message may be encapsulated within the protocol message.

Upon receiving a client application message, duplex service component 106 can dispatch the message to the appropriate service from among of services 111 based on at least the anonymous endpoint identifier and session identifier.

Figure 2A:
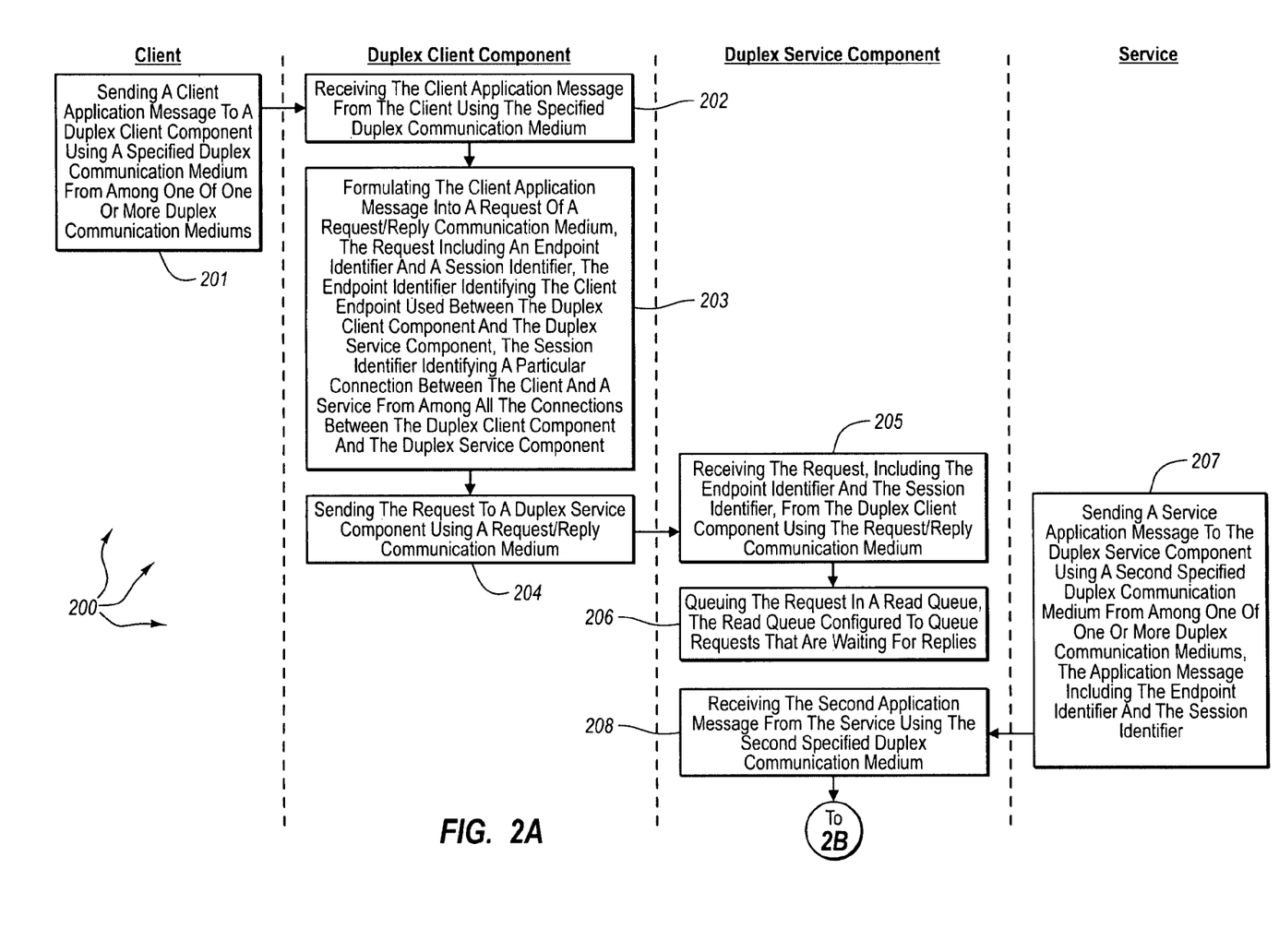
FIGS. 2A and 2B illustrates a flow chart of an example method for multiplexed communication for duplex applications.
Figure 2B:
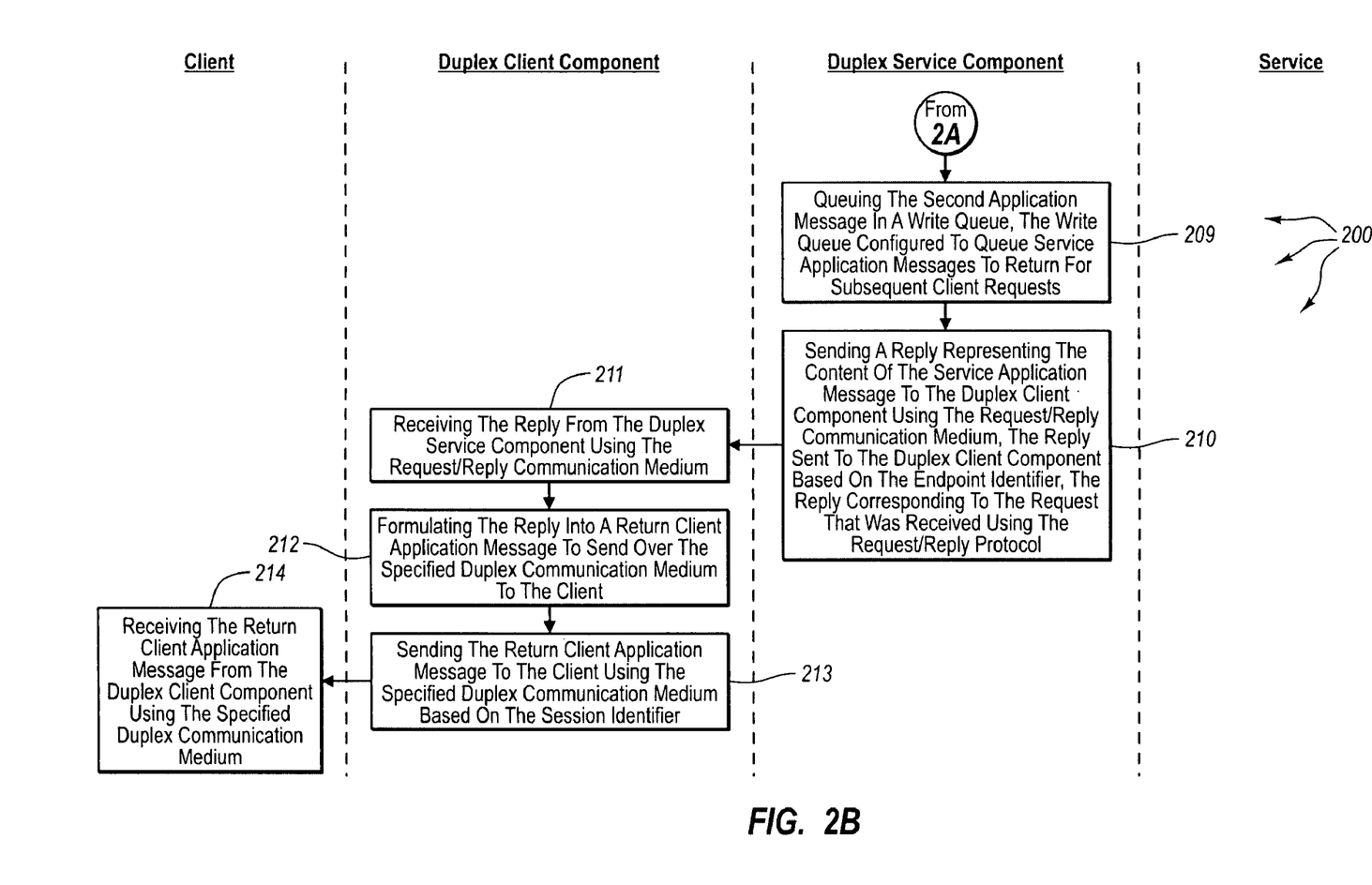

FIG. 2 illustrates a flow chart of an example method 200 for multiplexed communication for duplex applications. Method 200 will be described with respect to the components and data of computer architecture 100.

Method 200 includes an act of a client sending a client application message to a duplex client component using a specified duplex communication medium from among one of one more duplex communication mediums (act 201). For example, client 101B can send message 131 to duplex client component 103A using duplex communication medium 102B.

Method 200 includes an act of the duplex client component receiving the client application message from the client using the specified duplex communication medium (act 202). For example, duplex client component 103A can receive message 131 from client 101B using duplex communication medium 102B.

Method 200 includes an act of the duplex client component formulating the application message into a request of a request/reply communication medium, the request including an endpoint identifier and a session identifier, the endpoint identifier identifying the client endpoint used between the duplex client component and the duplex service component, the session identifier identifying a particular connection between the client and a service from among all the connections between the duplex client component and the duplex service component (act 203). For example, duplex client component 103A can formulate client application message 131 into request 132. Request 132 includes end point ID 133 (corresponding to duplex client component 103A and session ID 134 (corresponding to client 101B).

Method 200 includes an act of the duplex client component sending the request to a duplex service component using the request/reply communication medium (act 204). For example, duplex client component 103A can send request 132 to duplex service component 106 using request/reply communication medium 104A.

Method 200 includes an act of the duplex service component receiving the request, including the endpoint identifier and the session identifier, from the duplex client component using the request/reply communication medium (act 205). For example, duplex service component 106 can receive request 132, including end point ID 133 and session ID 134, from duplex client component 103A. End point ID 133 and session ID 134 can correspond to a previously established session between client 101B and service 111A. Accordingly, duplex service component 106 can determine that the request corresponds to this previously established session.

In some embodiments, message 132 contains application data for service 111A or is request to service 111A to generate responsive service application messages.

However, in other embodiments, message 132 is a poll message. A poll message represents a poll of duplex service component 106 for previously requested response service application messages from service 111A that correspond to end point ID 133.

For example, from time to time (and independent of the reception of a client application message), a duplex client component (e.g., 103A) may send a poll protocol messages on behalf of active clients that previously created a connection. A poll protocol message may be transmitted as a request message using the request-reply communication medium in the same fashion as client application messages. The poll protocol message may not be associated with any particular application request and may be distinguishable from a client application message via inspection. For example, a poll protocol message may use a distinguishing SOAP action that is different than the SOAP actions used by any of the client application messages. The poll protocol message may contain the anonymous endpoint identifier but not any session identifier because the poll request is on behalf of all of the active clients rather than a specific client.

As an example, a poll protocol message may be formatted in XML as in the following message fragment, which should be contrasted with the message fragment used for client application messages or CreateSession protocol messages.

```
<wsmc:MakeConnection xmlns:wsmc="http://docs.oasis-open.org/ws-
rx/wsmc/200702">
   <wsmc:Address>
      http://docs.oasis-open.org/ws-rx/wsmc/200702/anonymous?id=
123fbcd4-e6a4-56be-7a32-66d84187a42c
   </wsmc:Address>
</wsmc:MakeConnection>
```

After receiving a client application message or poll protocol message request message, a duplex service component (e.g., 106) may decide to send a reply message using the request-reply communication medium. If the duplex service component does not have any service application messages to send, it may send an idle protocol message. For example, an HTTP protocol message with status 202 Accepted may be sent as the idle protocol message.

To facilitate low-latency communication, the duplex service component (e.g., 106) may provide polling hints in an idle protocol message or service application message about when it may be opportunistic to send the next poll protocol message. A polling hint may be that the duplex service component has more messages waiting for the anonymous endpoint identifier and that the next poll protocol message should be sent immediately. Alternately, a polling hint may be that messages will be occurring with a greater or less frequency and that the polling interval should be decreased or increased as appropriate.

When sending a reply message, the duplex service component (e.g., 106) may select one or more service application messages from the pending write queue (e.g., 108) to send to the duplex client component. The messages may be for the same connection as the request message (if the request message was a client application message that included a session identifier) or the messages may be for other connections that share the same anonymous endpoint identifier. The duplex service component may send a single service application message for the reply or may employ a batching protocol to send multiple application messages at once. The single service application message may use the same application protocol as other application messages or may be represented in some different protocol.

Additionally, rather than send a reply message immediately, the duplex service component (e.g., 106) may decide to wait for some time before replying. For example, the duplex service component may have no messages in the pending write queue (e.g., 108) with the particular anonymous endpoint identifier, but the duplex service component may believe that such messages are to eventually be sent.

The length of time that the duplex service component waits before responding may be based on any of a variety of factors. For example, the length of time may be determined by analyzing the client application message and computing an expected time for the application operation to complete and send a service application message. Alternately, the length of time may be specified by the service author or the duplex service component administrator. The length of time may also be based on the available service resources or by sensing of network conditions between the client and service. Advice on the length of time may be provided as protocol hints by the client, the duplex client component, or other network intermediaries in the exchanged messages or other protocol messages.

In some embodiments, a service may delay sending a reply message for as long as possible given available service resources, but without risking the client or other network intermediaries giving up on ever seeing a reply message. By delaying sending the reply message, fewer network resources are required to exchange messages because it is not necessary to send extra poll protocol messages. Delaying sending the reply message also increases the probability that a service application message can be immediately transmitted and potentially avoids any latency from having to wait in the pending write queue.

The duplex service component (e.g., 106) may also use a pending read queue (e.g., 107) to manage the unanswered poll protocol messages and client application messages. The pending read queue may place bounds on the number of pending readers for a particular anonymous endpoint identifier or the total number of pending readers. If the queue is full, the duplex service component may drop the new pending reader or may replace one of the earlier pending readers to balance fairness between newer and older requests.

Accordingly, returning back to FIG. 2, method 200 includes an act of the duplex service component queuing the request in a read queue, the read queue configured to queue requests that are waiting for replies (act 206). For example, duplex service component 106 can queue message 132 in pending read queue 107 to wait for messages to return to duplex client component 103A.

It may be that service 111A eventually supplies a message for client 101B. As such, method 200 includes an act of the service sending a service application message to the duplex service component using a second specified duplex communication medium from among one of one or more duplex communication mediums, the service application message including the endpoint identifier and the session identifier (act 207). For example, service 111A can send message 136 to duplex service component 106 over duplex communication medium 109A. Message 136 includes end point ID 133 (identifying duplex client component 103A) and session ID 134 (identifying client 101B).

Method 200 includes an act of the duplex service component receiving the second application message from the service using the second specified duplex communication medium (act 208). For example, duplex service component 106 can receive message 136 from service 111A.

Turning now to FIG. 2B, method 200 includes an act of the duplex service component queuing the second application message in a write queue, the write queue configured to queue service application messages to return for subsequent client requests (act 209). For example, duplex service component 106 can queue message 136 in pending write queue 108. Pending write queue 108 can be configured to queue service application messages from services 111 to return from for subsequent requests from clients 101.

Method 200 includes an act of the duplex client service component sending a reply representing the content of the second application message to the duplex client component using the request/reply communication medium, the reply sent to the duplex client component based on the endpoint identifier, the reply corresponding to the request that was received using the request/reply protocol (act 210). For example, duplex service component 106 can send reply message 137 to duplex client component 103A using request/reply communication medium 104A. Reply message 137 can be a reply corresponding to request 132. Reply message 137 can include the response to content from message 136, including session ID 134, and can be sent to duplex client component 103A based on end point ID 133.

Pending read queue 107 and pending write queue 108 can compensate for timing differences when receiving requests and service application messages for replying to those requests. Thus, embodiments of the invention include receiving requests prior to service application messages for replying to the requests. Embodiments of the invention also include receiving service applications messages prior to requests for the service application messages.

For example, it may that when duplex service component 106 receives message 136 that message 132 is already queued in pending read queue 107. Thus, upon receiving message 136 duplex service, component 106 can detect a match in end point IDs and send reply message 137 to duplex client component 103A. Alternately, message 136 may have been received and queued in pending write queue 108 prior to receiving request 132. Thus, upon receiving request 132, component 106 can detect a match in end point IDs and send reply message 137 to duplex client component 103A.

Method 200 includes an act of the duplex client component receiving the reply from the duplex service component using the request/reply communication medium (act 211). For example, duplex client component 103A can receive reply 137 over request/reply medium 104A.

Method 200 includes an act of the duplex client component formulating the reply into a return client application message to send over the specified duplex communication medium to the client (act 212). For example, duplex client component 103A can formulate reply 137 into client return application message 138 to send over duplex communication medium 102B.

Method 200 includes an act of the duplex client component sending the return client application message to the client using the specified duplex communication medium based on the session identifier (act 213). For example, duplex client component 103A can send client return application message 138 to client 101B over duplex communication medium 102B based on session ID 134.

Method 200 includes an act of receiving the client return application message from the duplex client component using the specified duplex communication medium (act 214). For example, client 101B can receive client return application message 138 from duplex client component 103A over duplex communication medium 102B.

Embodiments of the invention include duplex client components polling duplex service components from time to time to request service application messages for clients the duplex client components are responsible for. Referring again now to FIG. 3, duplex client component 352 can send poll message 306 (a request) to duplex service client 353. Poll message 306 can request messages for client 351 or any other clients duplex client component 352 is responsible for. Duplex service component 353 can respond to poll 306 with idle message 307 (a reply to poll 306). Idle message 307 indicates that the duplex service component has no messages for duplex client component 352 (i.e., no messages with an end point ID for duplex client 352).

Duplex service component 353 can determine an idle time out period to wait before responding to poll messages. In some embodiments, the idle time out is a predetermined static number. In other embodiments, the idle time out is initially set to a pre-determined value but is adjustable based on communication with duplex client component 352, network conditions, resource availability, etc. For example, duplex service component 353 can receive a suggestion for an idle time out interval from duplex client component 352 (e.g., in an application message or poll message). In response to receiving a suggested idle time out interval, duplex service component 353 can adjust its current idle time out interval toward the suggested idle time out interval, or even set the current idle time out interval to the suggested time out interval.

In further embodiments, client 351 and service 354 negotiate an idle time out interval that balances resource conservation against message loss at intermediate network components based on sensed network conditions. Negotiation can reduce the likelihood of messages being lost at intermediate network components due to the intermediate network components having a smaller idle time out interval than the idle time interval of duplex service component 353 (or what is sometimes referred to as a messaging block hole).

Thus, upon receiving poll message 307, duplex service component 353 can wait a specified idle time out interval (determined from any of the previously described mechanisms) before returning idle message 307 to duplex client component 352. Idle message 307 can include a hint related to when server application messages might be available for the duplex client component 352.

Accordingly, at some point after receiving idle message 307, and potentially in accordance with a received hint, duplex client component 352 can send poll message 308 (a request) to duplex service component 353. Subsequently, duplex client component 352 can also send client application message 309 to duplex service component 353. Subsequent to client application message 309, duplex service component 353 can send idle message 311 (a reply to application message 309) after the specified time out interval after receiving client application message 309. Alternatively, duplex service component 353 may send idle message 311 before the specified time out interval if duplex service component 353 does not require both poll message 308 and client application message 309 for sending service application message replies. In other embodiments, duplex service component 353 may have chosen to send idle message 311 in response to poll message 308 instead.

Subsequently, service 354 can send service application message 312 to duplex service component 353. Service application message 312 can be temporarily queued at duplex service component 353. Duplex service component 353 can determine that service application message 312 corresponds to poll 308 (e.g., by end point ID). Duplex service component 353 can send reply 313 back to duplex client component 352 that sends a return application message 323 to client 351 (e.g., based on session ID).

Similarly, service application message 314 can be sent to duplex client component in reply 316 in response to poll message 315. Service message 314 can be included in return client application message 317 sent from duplex client component 352 to client 351.

Either a client or service may send a CloseHalfSession protocol message to indicate that the client or service respectively does not intend to send any more application messages for this connection in the future. The client may also send a CloseSession protocol message to indicate that the session is terminated and that no more application messages may be transmitted by either the client or service. The use of closing protocol messages is an optimization to allow for the graceful closing of a connection. All closing protocol messages are optional and either the client or service may consider the connection to have expired or timed out at any time and may discard the resources associated with the connection at that time. A client or service that receives application or protocol messages for a connection that has been gracefully or ungracefully closed may consider those messages to be erroneous.

As such, client 351 can send close message 318 to duplex client component 352. Close message 318 can include an end point ID and session ID. Duplex client component 352 can send close session message 319, including the end point ID and session ID, as a request message to duplex service component 353. Duplex service component 353 can forward close message 318 to service 354. Based on close message 318, service 354 knows it is no longer supposed to send messages to client 351. Duplex service component 353 can also send idle message 320 (a reply to close session 319) back to duplex client component 352.

Thus, embodiments of the invention facilitate a multiplexed variant of long polling over a request/reply communication medium that (potentially significantly) reduces the resources utilized when exchanging messages. The combination of end point identifiers and session identifiers facilitates polling and routing for a pool of many clients and many services while minimizing allocated resources to each established session. Further, the benefits of a lower latency bidirectional communication medium between clients and services can be utilized.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a duplex service component, the duplex service component communicating with one or more services over one or more duplex communication mediums and communicating with one or more duplex client components over one or more request/reply communication mediums, a method for transferring data in response to a client request, the method comprising:

an act of the duplex service component receiving a request for messages from a duplex client component using one of the one or more request/reply communication mediums, the request including an endpoint identifier identifying a client endpoint used between a corresponding duplex client component and the duplex service component, the corresponding duplex client component selected from among the one or more duplex client components, the corresponding duplex client component connected to a client;

an act of the duplex service component queuing the request in a read queue, the read queue configured to queue requests that are waiting for replies;

an act of the duplex service component receiving an application message from a service using one of the one or more duplex communication mediums, the application message including the endpoint identifier and a session identifier, the session identifier identifying a transfer session between the service and a client connected to the duplex client component;

an act of the duplex service component queuing the application message in a write queue, the write queue configured to queue application messages to return for subsequent client requests; and an act of the duplex service component sending a reply to the duplex client component using the request/reply communication medium, the reply sent to the duplex client component based on the endpoint identifier, the reply corresponding to the request that was received using the request/reply protocol.

2. The method as recited in claim 1, wherein the act of the duplex service component receiving a request for messages from a duplex client component comprises an act of the duplex service component receiving a poll message from the duplex client component, the poll message representing a request for application messages for any clients connected to the duplex client component.

3. The method as recited in claim 2, wherein the act of the duplex service component receiving a poll message from the duplex client component comprises an act of receiving a poll message that suggests an idle timeout interval to the duplex service component.

4. The method as recited in claim 1, wherein the act of the duplex service component receiving a request for messages from a duplex client component comprises an act of the duplex service component receiving an application message from the duplex client, the application message including a session identifier identifying a transfer session between the client and a service connected to the duplex service component; and further comprising:

an act of formulating the request into a message to send over one of the one or more duplex communication mediums; and an act of sending the message to the service using the duplex communication medium based on the session identifier.

5. The method as recited in claim 4, wherein the act of the duplex service component receiving an application message from the duplex client component comprises an act of receiving a batch of application messages, the batch containing a plurality of session identifiers, the application messages sent to services over one or more of the one or more duplex communication mediums based on the session identifiers.

6. The method as recited in claim 1, wherein the act of the duplex service component queuing the request in a read queue comprises:

an act of determining that the read queue is full; and
an act of positioning the request in a random location in the read queue thereby overwriting the random location within the read queue with the request.

7. The method as recited in claim 1, wherein the act of the duplex service component queuing the request in a read queue comprises an act of positioning the request in a location in the read queue based on one or more of user authentication, service level agreements, and available service resources.

8. The method as recited in claim 1, wherein the act of the duplex service component sending a reply to the duplex client component comprises an act of sending a reply that includes the application message to the duplex client component.

9. The method as recited in claim 1, wherein the act of the duplex service component sending a reply to the duplex client component comprises an act of sending an idle message to the duplex client component.

10. The method as recited in claim 9, further comprising:
an act of determining an idle time out interval; and
an act of waiting the idle time out interval in response to receiving the request from the duplex client component prior to sending the idle message.

11. The method as recited in claim 10, wherein determining the time out interval comprises:
an act of receiving a suggestion for an idle time out interval from the client; and
an act of adjusting a current idle time out interval towards the suggested idle time out interval received from the client.

12. The method as recited in claim 10, wherein determining the time out interval comprises an act of the client and the service interacting to determine an idle time out value that balances resource conservation against message loss at intermediate networking components situated between the client and the service based on sensed network conditions.

13. The method as recited in claim 9, further comprising an act of determining that a second request message from the duplex client component is in the read queue; and an act of selecting one of the request messages from the duplex client component; wherein the act of sending an idle message to the duplex client component comprises sending the idle message as the reply corresponding to the selected request message.

14. The method as recited in claim 9, wherein the act of sending an idle message to the duplex client component comprises an act of sending an idle message that includes a hint related to when application messages might be available for the duplex client component.

15. The method as recited in claim 14, wherein the hint is that application messages might be available immediately.

16. The method as recited in claim 1, wherein the act of the duplex service component sending a reply to the duplex client component comprises an act of sending a batch of application messages to the duplex client component, the batch of application messages including application messages for a plurality of different clients connected to the duplex client component.

17. The method as recited in claim 1, further comprising:
an act of the duplex service component receiving a create session request from the duplex client component, the create session request including the endpoint identifier and a session identifier for a client connected to the duplex client component;
an act of the duplex service component determining to accept the session based on one or more of: user authorization, a service level agreement, and available resources; and
an act of the duplex service component sending a session accept message to the duplex client component in response to the determination.

18. The method as recited in claim 1, wherein the duplex service component and the service are collocated in a shared application space and wherein the duplex communication medium is a method call.

19. At a computer system including one or more processors and system memory, the computer system also including a duplex client component, the duplex client component communicating with one or more clients over one or more duplex communication mediums and communicating with a duplex service component over a request/reply communication medium, a method for transferring data in response to a client request, the method comprising:
an act of the duplex client component receiving an application message from a client using one of the one or more duplex communication mediums;
an act of the duplex client component formulating the application message into a request of a request/reply protocol, the request including an endpoint identifier and a session identifier, the endpoint identifier identifying the client endpoint used between the duplex client component and the duplex service component, the session identifier identifying a particular connection between the client and a service from among all the connections between the duplex client component and the duplex service component;
an act of the duplex client component sending the request to the duplex service component using the request/reply communication medium; and
an act of the duplex client component receiving a reply from the duplex service component using the request/reply communication medium, the reply sent to the duplex client component based on the endpoint identifier, the reply corresponding to the request sent using the request/reply communication medium.

20. The method as recited in claim 19, further comprising:
an act of the duplex client component sending a poll message to the duplex service client, the poll message requesting messages from any clients connected to the duplex client component.

21. The method as recited in claim 19, wherein the act of the duplex client component receiving a reply from the duplex service component comprises an act of receiving an idle message from the duplex service component, the idle message indicating that the duplex service component does not have any messages for clients connected to the duplex client component.

22. The method as recited in claim 19, wherein the act of the duplex client component receiving a reply from the duplex service component comprises an act of receiving a reply that includes an application message from the service and that includes a second session identifier; and further comprising:
an act of formulating the reply into a message to send over one of the one or more duplex communication mediums; and
an act of sending the message to the client using the duplex communication medium based on the second session identifier.

23. The method as recited in claim 22, wherein the act of the duplex client component receiving a reply from the duplex service component comprises an act of receiving a batch of application messages, the batch containing a plurality of session identifiers, the application messages sent to clients over one or more of the one or more duplex communication mediums based on the session identifiers.

24. The method as recited in claim 19, wherein the duplex client component and the client are collocated in a shared application space and wherein the duplex communication medium is a method call.

25. A network system, including one or more clients, one or more duplex client components, a duplex service component, and one or more services, each of the one or more clients connected to one of the one or more duplex client components on a network over one or more duplex communication mediums, each of the one or more duplex client components connected to the duplex service component on the network over one or more request/reply communication mediums, and the duplex service component connected to each of the one or more services on the network over one or more duplex communication mediums, the network system comprising:
a duplex service component computer system, the duplex service component computer system including:
one or more processors;
system memory; and
one or more physical storage media having stored thereon computer-executable instructions representing a duplex service component, wherein the duplex service component is configured to:
receive client application messages, batches of client application messages, and requests for application messages from duplex client components using HyperText Transfer Protocol, the requests for application messages being poll messages that include endpoint identifiers, the endpoint identifiers identifying client endpoints used between a corresponding duplex client component and the duplex service component;
queue received requests in a read queue;
forward client application messages to the appropriate service using one of the duplex communication mediums;
receive service application messages from services using the one or more duplex communication mediums, the application messages including endpoint identifiers identifying client endpoints and a session identifier identifying a particular connection between a client and the service from among all of the connections between the duplex client component and duplex service component;
queue server application messages in a write queue; and
send replies to the duplex client components using the HTTP protocol, replies including one of: an application message including an endpoint and session identifier, a batch of application messages, and an idle message; and one or more duplex client component computer systems, each duplex client computer system including:
one or more processors;
system memory; and
one or more physical storage media having stored thereon computer-executable instructions representing a duplex client component, wherein the duplex client component is configured to:
receive client application messages from clients using the one or more duplex communication mediums;
generate requests for service application messages on behalf of the clients connected to the duplex client component;
formulate client communication into HypterText Transfer Protocol messages, including formulating requests for service application messages into poll messages in the HyperText Transfer Protocol, the poll messages including endpoint identifiers, the endpoint identifiers identifying the client endpoint used between the duplex client component and the duplex service component, the client application messages including endpoint and session identifiers, the session identifiers identifying a particular connection between the client and a service from among all the connections between the duplex client component and the duplex service component;
send client communication to the duplex service component using HyperText Transfer Protocol; and
receive replies from the duplex service component using HyperText Transfer Protocol, replies including one of: an application message including an endpoint and session identifier, a batch of application messages, and an idle message.

* * * * *